INVENTOR.
WAYNE M. ROSS

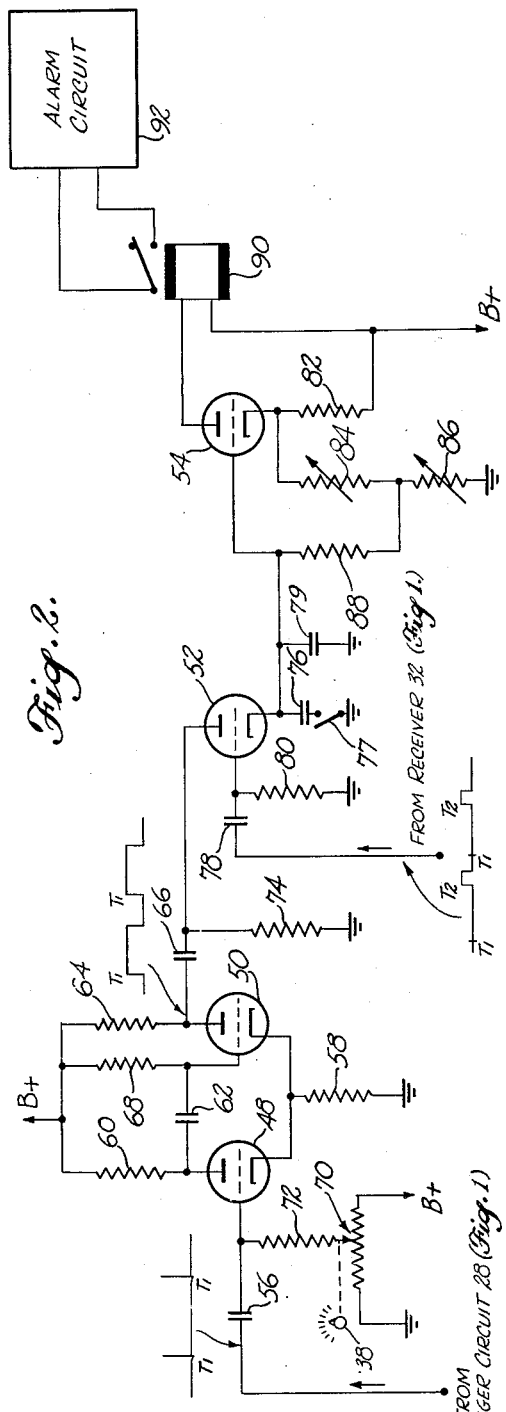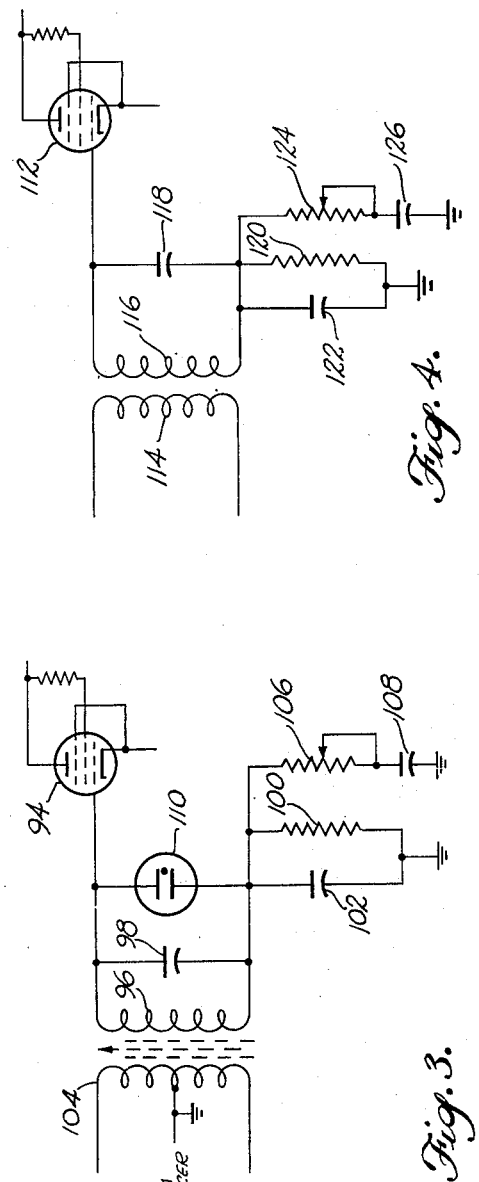

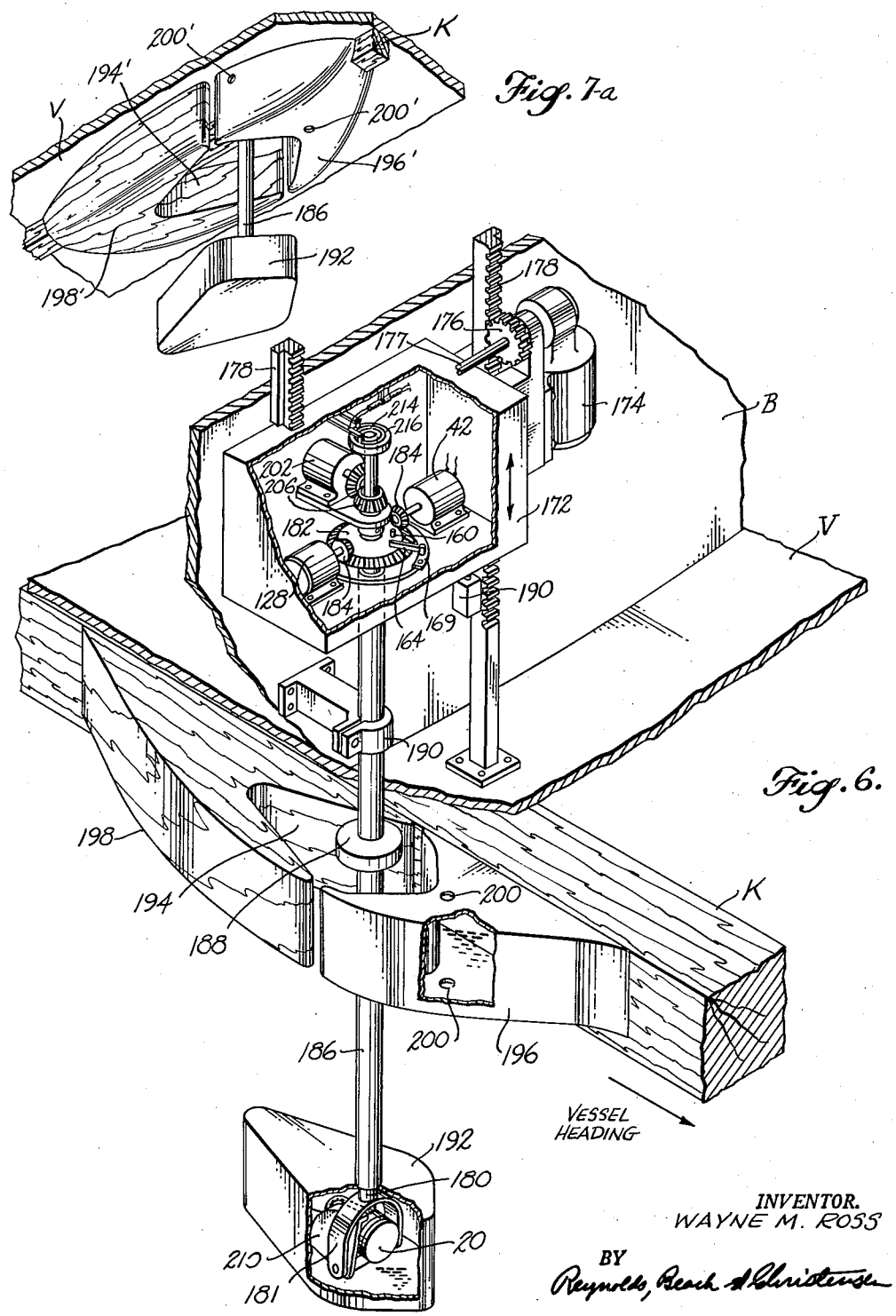

Aug. 21, 1956 W. M. ROSS 2,759,783
UNDERWATER ULTRASONIC DETECTING SYSTEMS
Filed March 10, 1952 6 Sheets—Sheet 4

INVENTOR.
WAYNE M. ROSS
BY
Reynolds Beach & Christensen
ATTORNEYS

Aug. 21, 1956 W. M. ROSS 2,759,783
UNDERWATER ULTRASONIC DETECTING SYSTEMS
Filed March 10, 1952 6 Sheets-Sheet 5
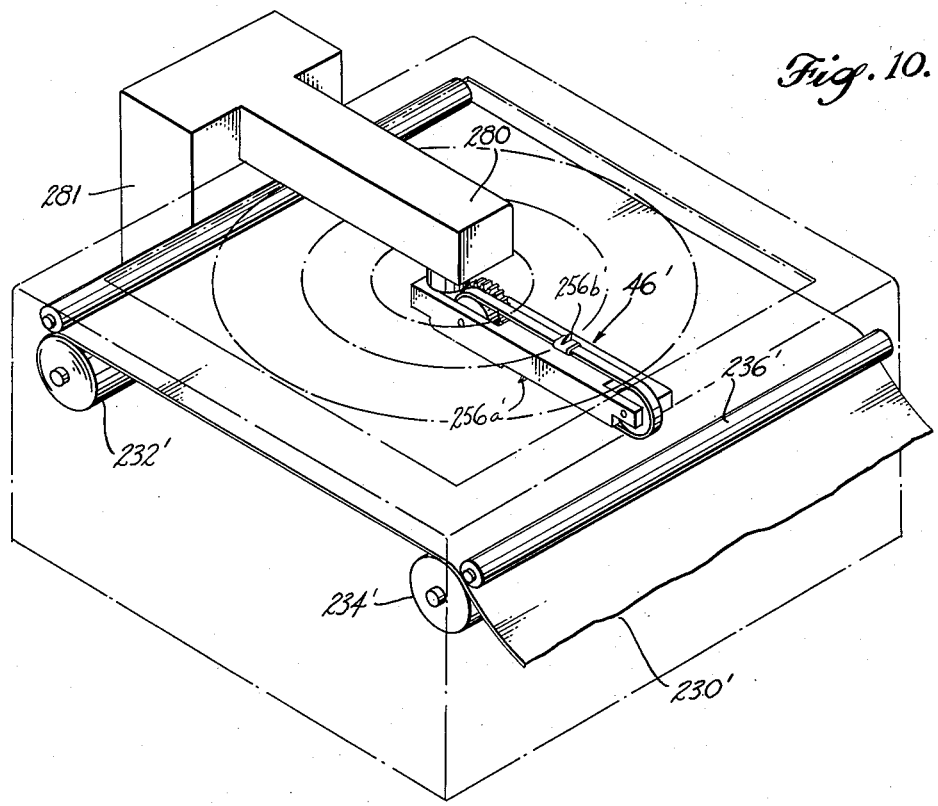
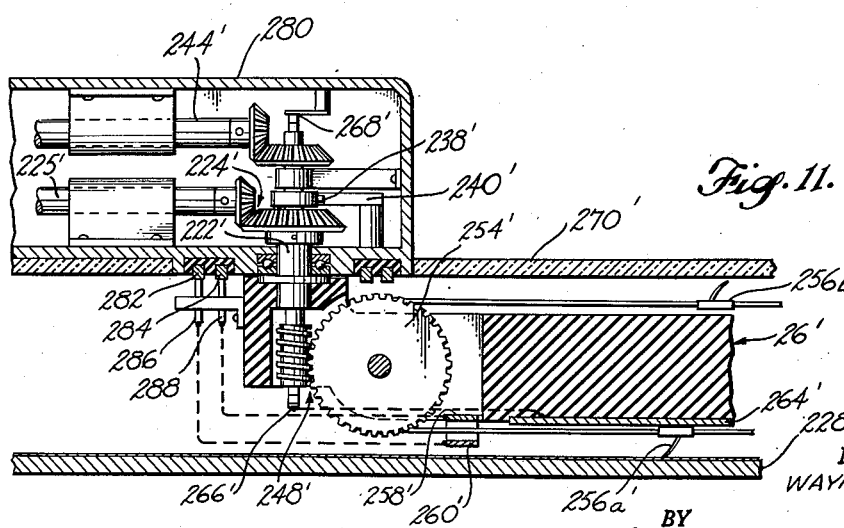
INVENTOR.
WAYNE M. ROSS
BY
Reynolds, Beach & Christensen
ATTORNEYS United States Patent Office 2,759,783
Patented Aug. 21, 1956

2,759,783

UNDERWATER ULTRASONIC DETECTING SYSTEMS

Wayne M. Ross, Seattle, Wash., assignor to Minneapolis-Honeywell Regulator Company, Minneapolis, Minn., a corporation of Delaware Application March 10, 1952, Serial No. 275,831

11 Claims. (Cl. 346—8)

This invention relates to systems utilizing reflections of transmitted wave energy for detecting the presence and location of remote objects, and primarily concerns improvements in ultrasonic underwater detection systems. A broad object of the invention is the provision of improved ultrasonic detection apparatus for use in conjunction with marine navigation, salvage, topographic studies, in locating and identifying schools of fish for commercial fishing purposes, in avoiding or tracking down submarines, mines, cables, etc., and for other uses. While the invention is herein illustratively described by reference to a preferred form thereof intended primarily for small surface vessel applications, including use aboard commercial fishing boats, tugboats, and the like, it will be apparent that a number of different variations therein are possible which adhere to the underlying features or substantial equivalents of the illustrated apparatus and fall within the scope of the appended claims.

Another object of the invention is an improved underwater detection system achieving a more complete and reliably constant search coverage than systems previously available. A related object is such a system which achieves a more definitive and directly interpretable display of search results than has been realized from indicators in former types of systems.

Still another object of the invention is an ultrasonic underwater detection system of the scanning type, capable of producing a continuous topographic display of sea-bottom and shoreline formations in addition to other reflecting objects and surfaces, whereby the vessel carrying the equipment may be navigated safely and expeditiously through shallow water, along narrow channels and around any obstructions which may occur in its path. The information provided by radar or Loran systems for navigating along narrow channels at night or through fog, is not always sufficiently accurate for the close guidance required in some waters, even if the bottom is charted precisely. This is due to the difficulty of precision distance measurements when dealing with the minute time intervals involved in electromagnetic energy propagation systems. In this connection the present invention utilizes effectively the comparatively slow speed of ultrasonic energy in water for measuring short distances accurately below water, and presents the detection information in a form most readily interpreted and acted upon by the nagivator.

A further object is the provision of automatic two-dimensional recording indication apparatus useful in conjunction with such systems for creating a permanent log or record, for both immediate and future reference, of the existing positions and preceding tracks of the various reflecting bodies in the water about the vessel. In this connection, the form of indication is such as will enable the operator to comprehend the situation of the vessel at a glance and act quickly upon the information received. The provision of permanent recording indicator means in a scanning type underwater ultrasonic system in accordance with this invention is a novel combination, of significance due not only to the simplicity and compactness of the apparatus, but also to the advanced nature of the indication afforded. One problem overcome thereby is that of producing a retentive total picture of the area below water surrounding the vessel, or of a particular sector of such area, such as may be viewed in its entirely at one time and without one portion fading as another is brought to view. In the past a chief obstacle in achieving such a result with available indicating techniques is the slow speed of ultrasonic energy propagation in water requiring relatively slow angular scan of a transducer to search adequately an appreciable area.

A further object of the invention is combined warning and indicating apparatus of a nature permitting the operator to devote his immediate attention elsewhere during much of the time without fear of having potentially dangerous objects or sea-bottom formations approach too closely to the vessel without his knowledge. More specifically, it is an object to provide means alerting the operator to the approach of a remote object to within a preselected range or distance from the vessel, which the operator may vary in accordance with the type of situation and the amount of advance warning desired, and in combination with such a warning means, automatic continuous recording indicator means to which the operator may immediately refer for information concerning the existing position and approximate track of the approaching object detected. A combination of this nature is obviously of distinct advantage aboard vessels having a small or busily occupied crew, and while particularly valuable as a detector of approaching enemy submarines and mines, is likewise useful in detecting the presence and location of schools of fish as well as detecting dangerously shallowing water. The combination has the further distinctive advantage of calling attention to the passage of different objects into and out of the search range of the ultrasonic system, although they remain inside the area of coverage for so short a time as to escape detection when other means of indication are employed. If, for example, a school of fish or an enemy submarine chances to pass very temporarily into the area of coverage of the system so as to produce at most a few echo impulses during one sweep of the scanning transducer, the automatic warning device would alert the operator, and the automatic recording indicator device would immediately inform him as to the direction in which to turn the vessel in order to overtake the particular object. Without both a warning and a persistent record for reference purposes, the operator might well remain oblivious to the event which has transpired.

Another object is a selective range threshold indicator and warning device useful in the foregoing combination and also as an independent means of indicating the approach of a remote object to within a given distance from the vessel, which distance may be varied at will. In this connection the improved indicator and warning device provides a means of tracking the remote object in range so as to permit following its movement in relation to the vessel.

Still another object of the invention is a simple and effective transducer scan control apparatus selectively operable to produce continuous scan thereof in either direction, sector scan operation in a particular sector, or manually operated scan permitting training the transducer in a particular direction at will. A necessary function of the scan control apparatus herein disclosed is to cause the transducer to seek and adhere to the correct sector scan angle regardless of the instantaneous position of the transducer at the time the apparatus is switched over from continuous scan to sector scan operation.

A further object of the invention is a satisfactory means protectively mounting and housing a scanning transducer below the vessel's hull in a manner minimizing collection of air bubbles which impede transmission of radiation to and from it, and also minimizing turbulence of the water giving rise to cavitation-effect noise background. A related object is a transducer protective shielding arrangement which is virtually "transparent" to ultrasonic energy propagation and is yet sufficiently rugged to ward off submerged objects such as logs and the like which might strike and damage the transducer housing as the vessel moves through the water. Another related object is an arrangement for protectively mounting and shielding the transducer and permitting the same to be lowered sufficiently beneath the hull to avoid interference therefrom and from trains of air bubbles passing thereunder.

Still another object of the invention is an improved cyclic automatic gain control for a pulsed-echo system receiver insuring approximate equality between receiver output signals corresponding to reflecting objects at different distances from the system. The presently improved automatic gain control circuit in addition to accomplishing the described automatic gain control function in simple and effective manner incorporates means serving the additional purpose of minimizing overloading of receiver amplifiers during operation of the transmitter in systems employing a single transducer for both transmission and reception purposes, or in equivalent systems.

Described in general terms, the illustrative system comprises a pulsed transducer arranged to scan in a generally horizontal plane during normal operation of the system but tiltable downwardly for searching to greater depths when desired. An automatic recording indicator is provided having a stylus arm which is rotated in synchronism with the scanning transducer and carries an electrical stylus moved at a constant rate lengthwise of the arm so as to travel radially outward on an underlying sensitized recording surface such as an electrolytic type of paper. Each time the stylus commences its outward travel from a central location on the recording surface switch contacts are engaged which trigger the ultrasonic frequency transmitter, and a pulse of ultrasonic energy is generated therefrom by the directional transducer. Ultrasonic energy reflections from remote objects return to the transducer as the stylus continues its progressive radial travel across the recording paper. Such energy reflections, converted into electrical signals, are applied by the system receiver to the traveling stylus and create visible permanent impressions on the sensitized recording paper. These markings on the recording surface bear a relationship to each other and to the center of the recorder, similar to the relationship between the corresponding reflecting bodies in the water about the vessel, and, as the transducer and stylus arm continue to rotate, combine to form a complete graphic display or "picture" of the existing conditions beneath the water's surface in the area of scan.

In its present preferred form, illustrated herein by alternative types of construction, the special recording indicator comprises an elongated arm pivoted at one end to rotate about the center of a flat plate electrode over which electrically sensitive recording paper is laid. An endless belt extending around pulleys at opposite ends of the rotative arm carries one or more stylus to which the receiver output signals are applied. In one form of the indicator as herein described the stylus arm is supported by a central shaft projecting up through the center of the plate electrode and thereby requires the use of two parallel strips of sensitized recording paper in the event such paper is to be movable over the plate electrode, as it usually will be, either continuously or by steps, so that fresh areas of paper will be presented as needed for recording purposes. In the second-described form the stylus arm is rotatively supported by an overhanging cantilever member and permits a single unsplit strip of sensitized paper to be employed.

The selective range threshold indicator and warning device synchronized with the system transmitter and preferably operating in conjunction with the recording indicator, comprises a delay multivibrator triggered simultaneously with the transmitter to produce a gate of selectively adjusted duration which sensitizes a time-coincidence vacuum tube amplifier circuit to echo signal impulses delivered to such circuit from the system receiver. Only a signal applied to the coincidence tube during the multivibrator gate becomes effective to actuate an alarm, whereas echo signals from objects at greater ranges are unable to do so. Calibration of the delay multivibrator control voltage adjusting means in terms of range (or depth of water) enables the operator to select the desired threshold range of the warning device. In addition thereto, fairly accurate range determinations with respect to a particular object may be made with the same simple device, if desired, simply by manipulating the adjusting element back and forth in order to maintain the trailing end of the multivibrator gate in approximate coincidence with the received signal from that object, as gauged by listening for intermittent presence and absence of the warning signal.

Application to the indicators of receiver output signals having substantially uniform intensity is insured by incorporation of cyclic automatic gain control means in one or more receiver amplifier stages to compensate for the diversity of signal strength, before amplification, of energy reflections from objects at considerably different distances from the system, especially those at relatively short range. Such automatic gain control means in its presently preferred form comprises a gaseous discharge tube connected across the tuned input circuit of receiver amplifier stage and in series with the grid return resistor of such stage, and an energy storage circuit connected across such grid return resistor. A gain-reducing bias voltage is applied to the amplifier stage and causes charging of the storage circuit as a result of grid current flow in the resistor during application to the receiver of direct high-level energy from the system transmitter. Upon termination of the transmitted pulse the receiver recovers its full gain at a rate determined by the discharge characteristic of the energy storage circuit, which may be designed in accordance with system requirements. During the short period of transmitter operation the gaseous discharge tube conducts, and thereby establishes a predetermined voltage across the tuned input circuit of the amplifier stage, such voltage being the characteristic discharge voltage of the type of tube and being substantially independent of discharge current flowing in the tube. As a result the initial bias voltage, and that to which the storage circuit is charged, hence the initial gain of the receiver during the reception interval, is standardized by the gaseous discharge tube and is substantially independent of such varying influences as off-tuning of the receiver input circuit, mismatch of such circuit to the transducer cable, variations in transmitted pulse power, etc.

Continuous scan of the system transducer in either direction is achieved by a scan control circuit incorporating a motor reversing relay by which polarity of the control winding voltage of the drive motor may be reversed. Sector scanning of the transducer is produced by switching into the motor reversing relay control winding circuit a pair of interdependent holding relays sequentially energized by engagement of switch contacts at preselected rotated positions of the transducer, such contacts being spaced apart in angle by the desired width of the scan sector. Because of the action of these holding relays, actuation of their respective energizing control contacts must take place in a certain sequence, before motor reversal can result therefrom, whereby the transducer is compelled to scan the correct sector angle regardless of its position when the circuit is switched over from continuous scan to sector scan operation.

Further features of the invention reside in the protective mounting and shielding arrangement for the ultrasonic transducer to be mounted alongside the vessel's hull. In the illustrative case, namely that in which the system is adapted for application to relatively small vessels, the transducer is preferably disposed directly alongside the keel when in retracted position for simple depth sounding operation or fixed-directional sounding ahead of the vessel, and may be lowered bodily into a position substantially below the hull for unobstructed scanning in a horizontal plane. A vertically adjustable streamlined housing in which the transducer is rotatively supported is filled with a liquid such as castor oil and is virtually "transparent" to the ultrasonic wave energy. Moreover, due to the streamline shape of this fixed housing collection of air bubbles and cavitation effect noise in the vicinity of the rotating transducer are minimized. In retracted position, the transducer housing enters a conformed recess or well defined between a forwardly extending hollow metallic fairing filled with liquid such as the water itself, and a rearwardly extending fairing which may be of wood or any other stiff material. The liquid-filled hollow front fairing mounted alongside the keel ahead of the liquid-filled transducer housing is likewise "transparent" to ultrasonic energy directed ahead of the vessel, and likewise serves as a deflector of air bubbles and a minimizer of cavitation effects, as well as in the capacity of a bumper or guard warding off submerged logs and other objects which would impair the transducer unit. While the rear fairing mounted alongside the keel behind the retracted transducer may also be of a like construction it is more economical to make it of wood in the typical case as it normally need not be transparent to energy propagation in the preferred mode of operating the overall system as described.

These and other features, objects and advantages of the invention, including certain details of the preferred form thereof, together with various subcombinations and components making up the same, will become more fully evident from the following description by reference to the accompanying drawings. For purposes of convenience in describing the system and its various components herein disclosed, certain simplifications are made and certain use of schematic illustrations is made in order to avoid elaboration on details and functions which are well known to those skilled in the art having regard to the present disclosure. Moreover, it will likewise be apparent to those skilled in the art that the particular means chosen for purposes of illustration are subject to variation or change to equivalent forms without departing from the essential principles involved therein.

Figure 2 is a schematic circuit diagram of the selective range threshold indicator and warning device.

Figure 3 is a schematic circuit diagram of a receiver input stage incorporating the improved cyclic automatic gain control.

Figure 4 is a schematic circuit diagram of a succeeding receiver amplifier stage incorporating a supplemental automatic gain control circuit.

Figure 6 is a perspective view with parts broken away showing the transducer mounting and housing arrangement together with physical details of the mechanical scan apparatus associated therewith.

Figure 7:
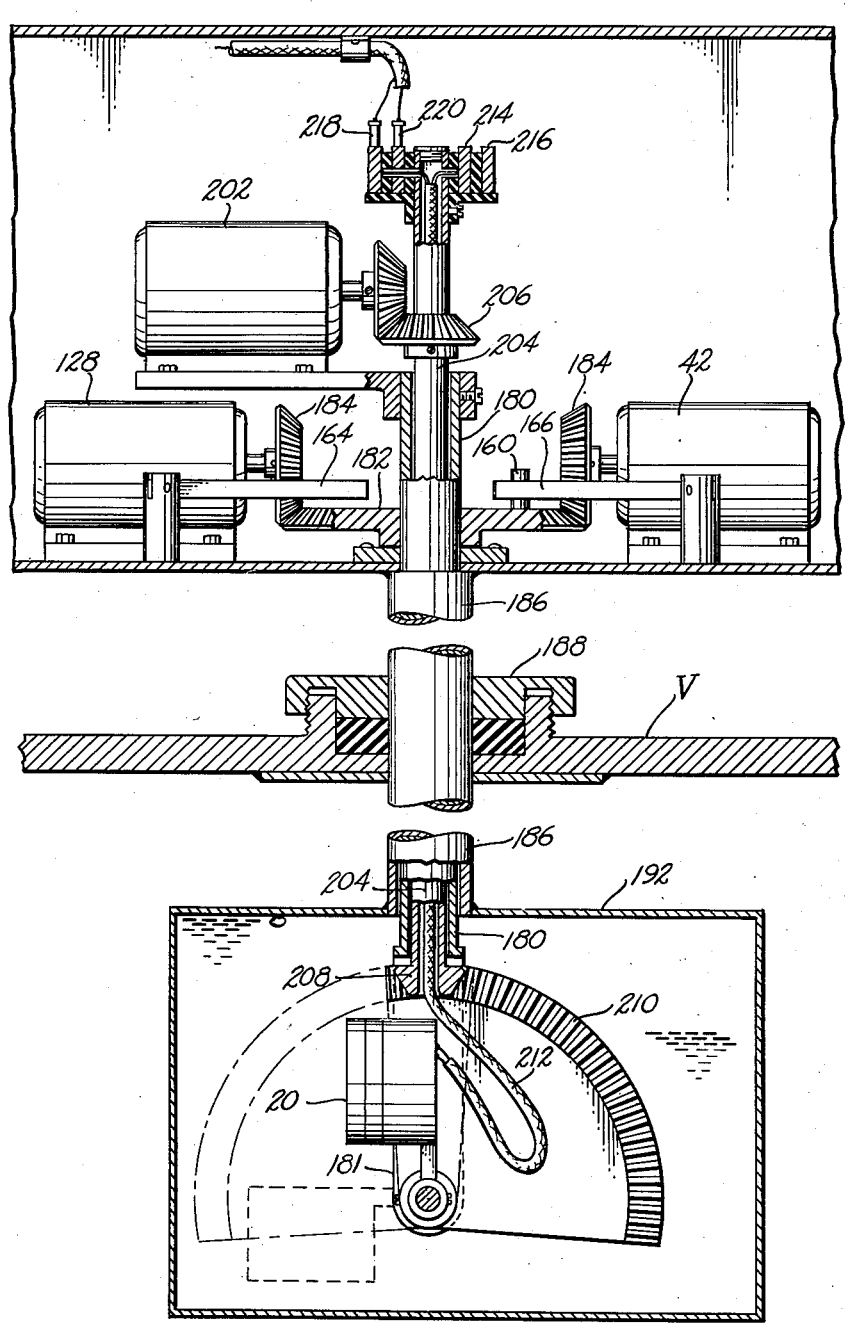
Figure 7 is a vertical longitudinal section of the apparatus appearing in Figure 6.

Figure 7-a is a perspective view showing a variation of the transducer housing arrangement appearing in Figure 6.

Figure 8:
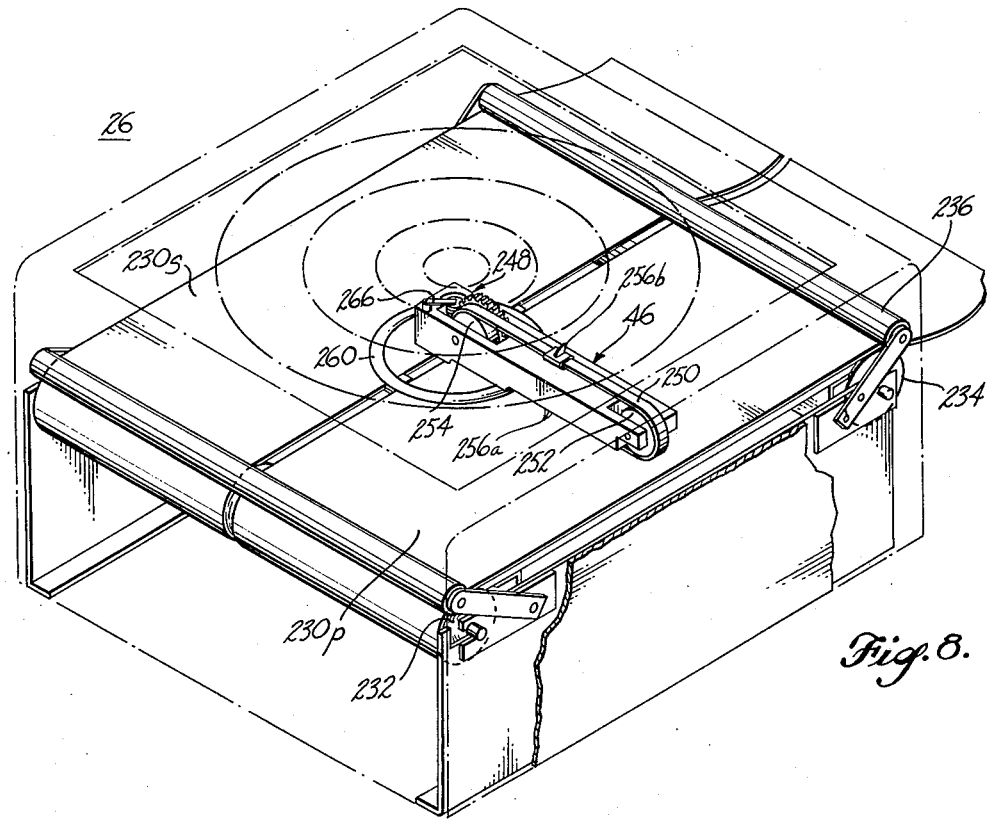

Figure 8 is a perspective view of the improved automatic recording indicator in one illustrative form.

Figure 9:
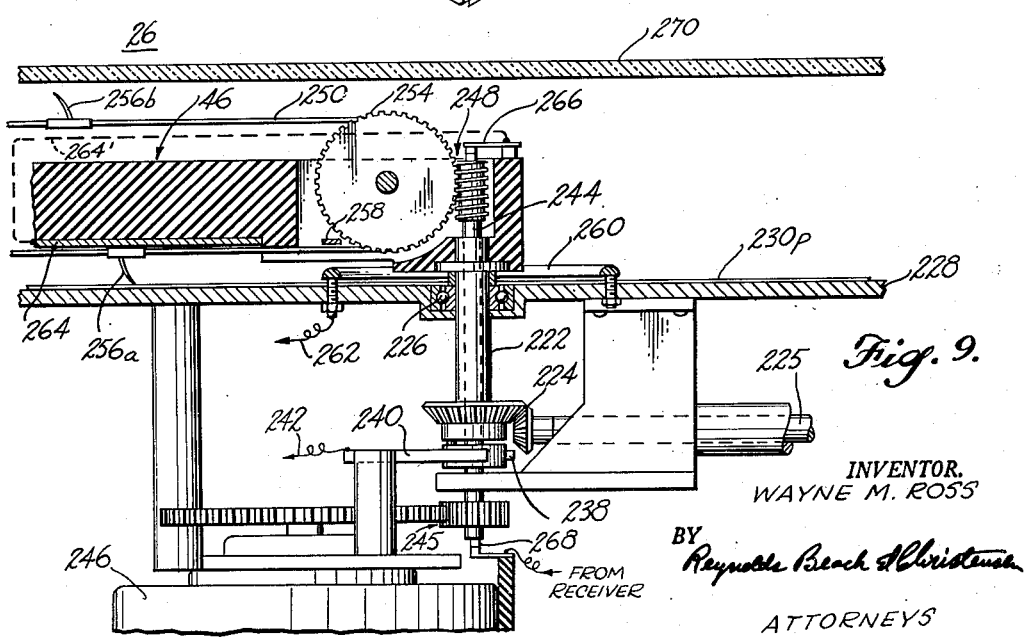

Figure 9 is an enlarged vertical sectional view taken through the center of the recording indicator shown in Figure 8.

Figure 10 is a perspective view of a modified form of the recording indicator.

Figure 11 is an enlarged vertical sectional view taken through the center of the modified indicator.

Figure 1:
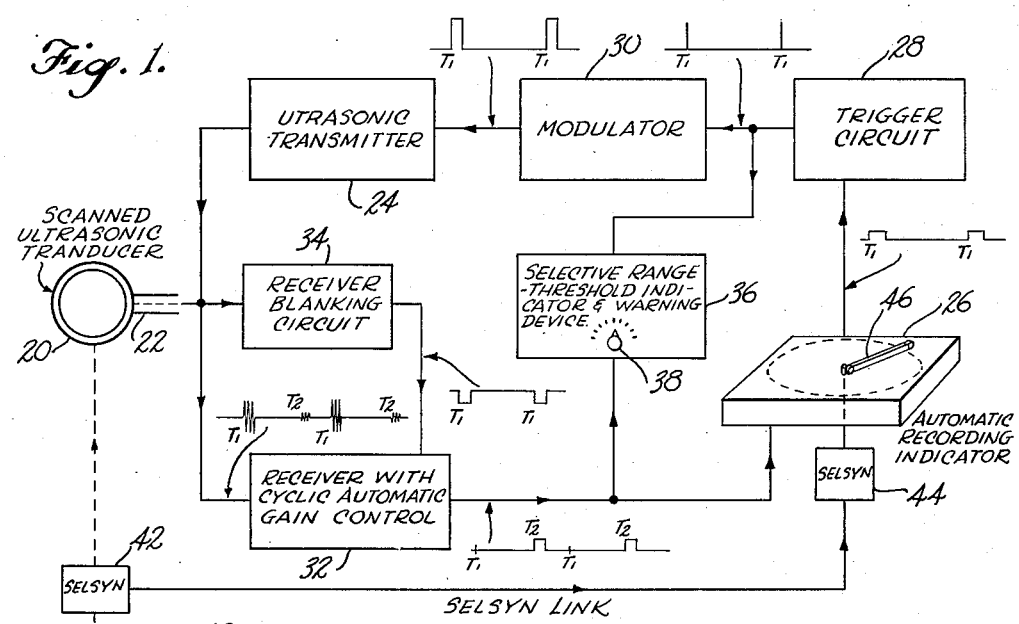
Figure 1 is a simplified schematic diagram of the illustrative ultrasonic detecting system.

With reference to Figure 1, the transducer unit 20 serves in the dual capacity of a transmitting and receiving transducer, although separate units could be used if desired. Pulses of ultrasonic-frequency electrical energy from transmitter 24 are conducted to the transducer through the shielded cable 22 and are there converted into a directive beam of ultrasonic energy. The weak ultrasonic energy reflections returning to the transducer from remote objects in the transmission beam are converted back into electrical energy for conduction to receiver 32. Pulse timing of the ultrasonic transmitter is controlled by the automatic recording indicator 26, which produces periodic timing impulses converted by the trigger circuit 28 into sharp trigger pulses applied to the modulator 30. The modulator in turn generates suitable rectangular pulses which energize the ultrasonic transmitter oscillator. The circuitry involved in generating the recurring ultrasonic frequency energy pulses in the manner illustrated schematically by blocks 28, 30, 24 and 22 and transducer 20 in Figure 1 is or may be of a conventional nature.

The ultrasonic frequency used is not critical and may be selected in a range between 25 and 500 kilocycles per second, more or less. A high operating frequency gives better definition for identifying and distinguishing small objects, such as submerged mines, submarine nets, cables, etc. However, by the same token seaweed, flotsam, etc., produce confusing reflections if the frequency is very high. A low frequency widens the beam, and lowers the energy concentration therein. Usually a frequency of between 50 and 200 kilocycles per second affords optimum compromise between attainable range, angular definition, and physical compactness of the transducer unit.

The faint ultrasonic energy pulses comprising the echoes returning from different reflecting bodies occurring in the transducer beam and applied to the receiver 32 as electrical signals bear a definite time-phase relationship to the transmitted pulses according to the respective distances to the various reflecting objects represented. The amplified receiver output signals are applied to a travelling stylus carried by arm 46 of the automatic recording indicator 26 and produce a permanent record of the different objects and reflecting bodies detected in the transducer beam.

As described in greater detail by reference to Figures 5, 6 and 7, the ultrasonic transducer 20 is mechanically driven by mechanical scan apparatus 40 to perform a continuous 360° scan in either direction about a vertical axis of rotation in the vessel, or to perform sector scanning back and forth in a restricted sector established by automatic controls in the scan apparatus. A selsyn transmitter 42 rotated in azimuth angle with the transducer energizes a receiver selsyn 44, which in turn drives the stylus arm 46 of the automatic recording indicator 26. The recording stylus arm 46 is thereby rotated synchronously with the transducer, so that the radial sweep of the stylus is constantly oriented in correspondence to the transducer beam and the echo signal impressions produced by the recording stylus combine to form a map-like display of the surrounding reflecting bodies or underwater topographic outlines, as the situation may be at the time. The details of the automatic recording indicator are described in greater detail by reference to Figures 8 to 11, inclusive, illustrating two somewhat different forms of the recording indicator.

A receiver blanking circuit 34 is preferably included in the system to blank a receiver output stage or stages during the period of transmitter operation so that the strong pulse energy passing directly from the transmitter to the receiver is blocked from the indicator portion of the system. Such a receiver blanking circuit may be similar to that disclosed in my earlier-filed, copending application Serial No. 271,962, entitled Receiver Blanking Circuit For Pulse Transmission Reception System, filed February 16, 1952.

The receiver 32 is also provided with an improved cyclic automatic gain control which establishes cyclically in one or more receiver amplifier stages a diminishing gain-reducing bias voltage wave commencing with the termination of each transmitted pulse, such that different pulse energy reflection signals at the receiver output are of the same order of magnitude although they come from objects at different ranges from the system and are initially of greatly different amplitudes. The details of the cyclic automatic gain control circuit in the receiver are specifically illustrated in Figures 3 and 4 to be described hereinafter.

A selective range threshold indicator and warning device 36 triggered synchronously with the modulator 30 and impressed with the output signals from receiver 32 is employed conjunctively with the automatic recording indicator 26 as previously mentioned. This device has a calibrated adjusting element 38 by which a desired threshold range setting may be established or varied. As described in greater detail by reference to Figure 2, whenever an echo signal appears in the receiver output corresponding to a reflecting body approaching the vessel closer than the range setting of the device 36 an audible warning or other suitable indication is produced, alerting the operator to that fact and thereby directing his attention to the automatic recording indicator 26 which reveals the existing location and previous track of the object producing the alarm.

Various wave forms occurring in different parts of the system appear in Figure 1 and illustrate the timing of the different components. The recurring time cycle commences with point $T_1$, at which the transmitter is energized, whereas the time $T_2$, a variable with relation to $T_1$, represents the time of reception of a particular echo pulse, arbitrarily chosen for purpose of illustration.

In the circuit shown in Figure 2, which circuit comprises the unit 36 designated "Selective range threshold indicator and warning device" in Figure 1, vacuum tubes 48 and 50 are connected together in a voltage-controlled delay multivibrator circuit, vacuum tube 52 comprises a time-coincidence amplifier, and vacuum tube 54 comprises an alarm actuating amplifier. The positive trigger impulses applied to the control grid of tube 48 through coupling condenser 56 momentarily overcome the initial negative bias in this tube established by quiescent plate current flow in tube 50. Such current flow produces a voltage drop through the resistor 58 connected between ground and the interconnected cathodes of the multivibrator tubes. With each such trigger pulse a voltage drop is produced at the anode of tube 48 due to the momentary increase of current flowing in its plate load resistor 60. This momentary voltage drop is transferred through coupling condenser 62 to the control grid of tube 50. The accompanying reduction of current in tube 50 reduces the potential at the cathode of tube 48, which further increases plate current in such tube. The action is cumulative and results in complete cut-off of tube 50. The resulting loss of voltage drop across plate load resistor 64 produces a positive voltage wave front at the anode of tube 50 which is applied through coupling condenser 66 to the anode of coincidence tube 52 and constitutes the initiation of a delay multivibrator gate or rectangular wave cycle indicated symbolically in the figure.

During the existence of positive square-wave voltage at the anode of tube 50 the charge accumulated on coupling condenser 62 during formation of the wave front gradually dissipates through resistor 68, until finally the control grid of tube 50 reaches a potential sufficiently positive with relation to its cathode to cause its return to the original conductive state. At that instant the cross-biasing roles of the two tubes are again reversed and the positive gate at the anode of tube 50 is terminated. The instant of time at which this reversal and termination occurs, that is the duration of the positive gate generated by the delay multivibrator, is determined by the potential prevailing at the interconnected cathodes of the two tubes during the existence of the gate. This potential is established by the setting of potentiometer 70, the variable contact of which is coupled through a grid return resistor 72 to the control grid of tube 48. The calibrated adjusting element 38 controlling the potentiometer setting may be moved to increase or decrease the duration of the multivibrator gate to any desired length.

The anode of coincidence tube 52 is maintained normally at ground potential through the resistor 74. The cathode of this tube is returned to ground through the storage condenser 76, whereas its control grid is impressed, through coupling condenser 78, with receiver output signals corresponding to the ultrasonic reflections from remote objects. The control grid is returned to ground through resistor 80.

While the anode of coincidence tube 52 remains at ground potential, all receiver output signals impressed on the control grid of such tube are effectively rejected by the coincidence circuit, that is, produce no plate current flow in the tube 52 and no actuation of the alarm circuit 92 through amplifier 54. Such is the case because the cathode of tube 52 is normally maintained at a potential somewhat above ground, depending upon the setting of the voltage divider circuit made up of resistor 82 in series with the variable resistors 84 and 86 and connected across a source of positive voltage as shown. The cathode of coincidence tube 52 is connected through the grid return resistor 88 of amplifier 54 to the juncture between variable resistors 84 and 86. A sufficient positive bias is applied to the cathode of coincidence tube 52 by relative adjustment of the variable resistors 84 and 86 to prevent conduction in that tube as a result of the multivibrator positive gate applied to the anode thereof in the absence of positive grid voltage.

However, if in point of time a receiver output signal occurs at the grid of tube 52 during the gate voltage at its anode, plate current will flow producing a positive voltage at the control grid of amplifier 54. The resultant flow of plate current in tube 54 energizes the alarm relay 90 to actuate the alarm circuit 92 and thereby informs the operator of the occurrence of a reflecting body within the threshold range gate. Condenser 76, normally grounded through switch 77, acts as a filter which retains a charge after each current impulse in tube 52 sufficient to hold tube 54 conductive as long as signals continue to be received during the period of the multivibrator gate on successive pulses of the system.

The alarm circuit 92 is shown merely as a unitary block in the figure. However, it may comprise a buzzer, a light, or any other means of alerting the operator to the presence of the reflecting object. Resistors 84 and 86 are adjusted to establish the necessary bias at the cathode of tube 54 in addition to that of tube 52, in order to prevent untimely energization of relay 90.

Whenever it is determined by the device in Figure 2 that a reflecting object lies within range of the system the control knob 38 may be adjusted exploratively back and forth about an average position so as to locate the object alternately inside and outside the shifting threshold range setting of the circuit, while the pulsating transducer beam is trained in the direction of such object. The operator may then determine the range and change of range of such object by noting the average position of knob 38 by reference to a range calibrated scale associated therewith. Normally closed switch 77 is opened at that time in order to allow the alarm circuit to become deenergized in the interval between succeeding pulses so that the operator may know immediately when the knob 38 is positioned on one side or the other of the critical range setting and may manipulate such knob back and forth more accurately about the correct average position, which indicates approximate range to the object. A relatively small condenser 79 in parallel with condenser 76 and switch 77 provides some integration of coincidence tube signal even with switch 77 open.

With reference to Figure 3, illustrating the presently preferred cyclic automatic gain control circuit associated with a receiver amplifier stage, all connections to the pentode amplifier tube 94 are not shown, but those omitted are or may be of a conventional nature. The tuned input circuit of this amplifier stage comprises the secondary inductance coil 96 and tuning condenser 98 connected together in parallel between the first grid of tube 94 and the grid return resistor 100. A small by-pass condenser 102 is connnected across resistor 100. Variable resistor 106 and storage condenser 108 arranged in series are also connected across grid return resistor 100. The condenser 108 is preferably much larger than condenser 102 (i. e. condenser 108 may be of the order of 0.1 microfarad, while condenser 102 is 200 micromicrofarads, for example, with resister 100 being one megohm and resistor 106 being 5 megohms, variable).

During the transmitted pulse in the system of Figure 1 ultrasonic-frequency voltage of relatively high amplitude is momentarily applied to the primary coil 104 and results in the flow of grid current in tube 94, producing a negative voltage across resistor 100. This negative voltage tends to bias the tube 94 negatively and limit the overloading of amplifier 94 during the transmittted pulse. It also results in the charging of storage condenser 108.

A gaseous discharge tube 110 (such as a neon diode) connected across the condenser 98 limits at a definite value the ultrasonic-frequency voltage that may be developed across secondary inductor 96, hence fixes the grid drive voltage applied to the control grid of tube 94 during the transmitted pulse. The integral of grid current flowing in tube 94 during each transmitted pulse is thereby regulated at a predetermined value for a given pulse length, as is the gain-reducing bias developed by voltage drop in grid leak resistor 100 during each such pulse. Of particular significance, however, is the fact that each transmitted pulse produces the same amount of charge in condenser 108, because of diode 110. Thus when the transmitted pulse is terminated and condenser 108 commences its exponential discharge through resistors 106 and 100, it does so commencing with the same initial voltage on every pulse cycle.

Thus condenser 108 affords a slowly diminishing gain-reducing bias voltage wave of a regulated amplitude, which is applied directly to the control grid of tube 94. The rate of decay of charge on condenser 108 may be varied by resistor 106 to prolong the wave over any desired initial portion of the interval between successive transmitted pulses in the system. While this variable bias wave may in some instances be made to consume nearly the entire pulse interval it is usually sufficient that it extend over but an initial fraction thereof, such as one-fifth to one-half. The constancy of discharge voltage of gas tube 110 on every pulse cycle overcomes such disturbing influences as variations in transmitter output power, off-tuning of the input circuit, mismatch in the input circuit, and other variations, preventing their influencing receiver gain by acting through the automatic gain control provisions.

It should be noted, however, that the presence of tube 110 across the input of receiver amplifier 94 does not otherwise materially affect the latter's gain, since the amplitude of received signals is insufficient to ionize such tube. Likewise the presence of resistor 106 and condenser 108 across grid return resistor 100 does not otherwise influence the reception and amplification of echo signals, as such signals are developed across the coil 96 which is effectively grounded at one end by condenser 102 at the ultrasonic frequencies of interest.

In Figure 4 a supplemental automatic gain control circuit is illustrated in conjunction with an amplifier stage 112 assumed to succeed the amplifier 94 of Figure 3, where both are incorporated in the same receiver. An input circuit primary coil 114, secondary coil 116, turning condenser 118, grid return resistor 120, by-pass condenser 122, and an R-C circuit comprising resistor 124 and condenser 126 connected across grid return resistor 12, are employed similar to the arrangement of Figure 3. However, the point of Figure 3 is to illustrate that no gaseous discharge diode is necessary in the stage 112 inasmuch as the gain-determining initial input voltage applied to this stage from stage 94 will already have been regulated or limited at a fixed amount by the regulating diode 110 in the stage 94. The stage 94 might, for example, comprise a radio-frequency amplifier in the receiver, in which the stage 112 comprises an intermediate-frequency amplifier. Thus the automatic gain control action afforded by the latter's R-C circuit 124, 126 would be directly added to that of the stage 94, and would be used in applications wherein the unsupplemented gain control magnitude in but a single stage is insufficient.

Figure 5:
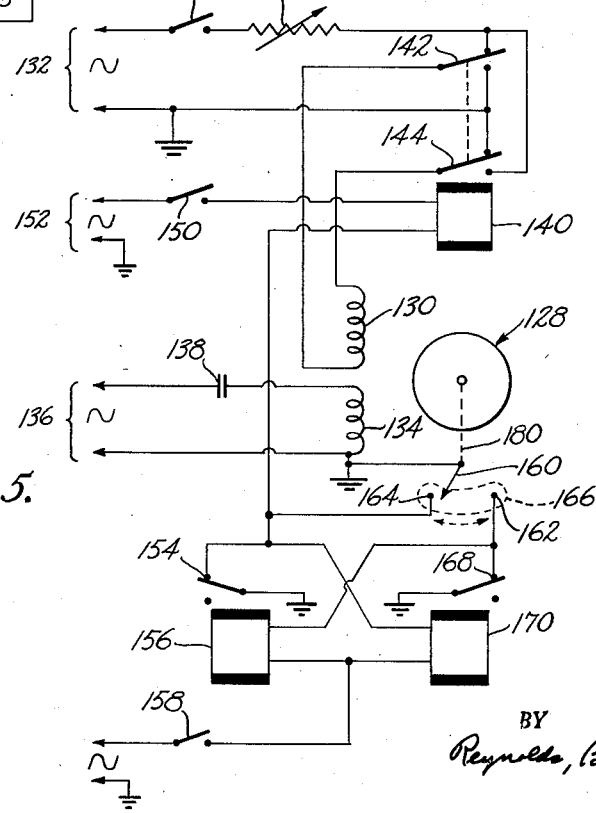
Figure 5 is a schematic diagram illustrating the electrical details of the transducer mechanical scan apparatus.

Control over movement of the transducer 20 selectively in order to produce continuous scan in either sense of rotation, or to produce sector scan, and to enable training the transducer in any chosen direction is accomplished through the medium of the scan control circuit illustrated in Figure 5. The conventional split-phase transducer drive motor 128 (Figures 5, 6 and 7) has a control winding 130 energizable by a suitable alternating voltage applied to circuit terminals 132, and a low-impedance reference winding 134. The latter is constantly energized by alternating voltage from circuit terminals 136, a major component of which voltage, due to condenser 138, is shifted in phase by 90 degrees relative to the voltage across control winding 130. The motor reversing relay 140 is of the double-throw type having its two switch arms 142 and 144 connected to the respective terminals of motor control winding 130. In its normal or unenergized position, relay 140 establishes an energizing circuit for control winding 130 causing scan motor 128 to rotate continuously in a normal scan direction, such as clockwise, when master switch 146 has been closed. Scanning may be stopped in any position of the transducer drive shaft 180 by opening master switch 146. Speed of rotation of the scan motor may be adjusted by means of the rheostat 148 connected in series with the switch 146. Closure of the reversing switch 150 applies energizing voltage to relay 140 from circuit terminals 152 and reverses the position of switch arms 142 and 144, which in turn reverses the phase of alternating voltage applied to control winding 130. Since the phase of alternating current in reference winding 134 is fixed, this action reverses the direction of rotation of scan motor 128, and causes the transducer to scan continuously in the counterclockwise sense, assuming master switch 146 and reversing switch 150 both remain closed.

The energizing circuit formed by closure of reversing switch 150 is completed through the normally engaged upper contact 154 of a single-pole relay 156 having a switch arm which is grounded. As long as a sector scan switch 158 is open, relay 156 will remain deenergized and the transducer scan motor will rotate continuously in a direction determined by the position of switch 150. In order to change from continuous scan to sector scan, certain other portions of the control circuit depicted in Figure 5 are placed in operation by closure of sector scan switch 158 while switch 150 remains closed. The periodic reversals of the scan motor 128 necessary to produce back-and-forth scan in a given sector are effected through alternate energization and deenergization of reversing relay 140 at established sector scan limits. For this purpose a switch element 160 is rotated by the transducer drive shaft 180 and brushes past angularly spaced switch contacts 162 and 164 which define the limits of the desired scan sector. Preferably this sector is about 100° wide and is normally centered at an angular position corresponding to the direction straight ahead of the vessel. If desired, however, the sector limit contacts 162 and 164 may be mounted on a support 166 which is adjustable in its angular position about the axis of switch element 160 in order to vary the direction of the scan sector. Means by which such movement may be effected, if desired, are not illustrated but may be of any suitable manually or automatically operated type. The width of the sector may be varied if desired, by mounting one of the switch contacts 162 or 164 for angular adjustment relative to the other. The contact 164 is connected electrically to the upper contact 154 of relay 156. The contact 162 is connected to the upper contact 168 of a third relay 170, having a single arm which is grounded similarly to relay 156. One winding terminal of each relay 156 and 170 is connected to one side of sector scan switch 158. The opposite winding terminal of relay 170 is connected to the switch contact 164, whereas the corresponding opposite winding terminal of relay 156 is similarly connected to the other switch contact 162.

The operation of the scan control circuit upon closure of sector scan switch 158, with switches 146 and 150 simultaneously in closed position, is as follows. Assuming switch element 160 is moving counterclockwise (Figure 5) from contact 164 toward contact 162 at the instant of closure of the sector scan switch, a change in the operating condition of the control circuit may or may not occur instantaneously therewith depending on which of relays 156 or 170 becomes energized by closure of switch 158. If relay 170 becomes so energized there will be no other change in the control circuit at that instant nor until switch element 160 engages contact 162. When this latter event occurs an energizing circuit for relay 156 is formed, opening the contact 154 of that relay and thereby breaking the energizing circuit of motor reversing relay 140. The latter immediately releases and the phase of alternating voltage applied to control winding 130 is reversed to reverse the direction of motor rotation and move the switch element 150 back toward switch contact 164. At the instant of this reversal the energizing circuit of relay 170 existing through relay contact 154 is broken by opening of that contact. This releases the arm of relay 170 and allows it to engage the contact 168 and establish a holding circuit for relay 156. Thus relay 156 remains energized while the reversed scan motor 128 moves the switch element 160 back toward switch contact 164.

On the other hand, if when switch 158 is first closed under the above assumed conditions relay 156 becomes energized instead of relay 170, then relay 140 is deenergized and the reversing circuit for the motor is broken. The motor now commences turning in the opposite (clockwise) sense and continues so to do until switch element 160 engages switch contact 164. When switch element 160 engages switch contact 164, it forms an energizing circuit for relay 170 and thereby opens contact 168 to break the existing energizing circuit of relay 156. Release of the latter relay reestablishes the energizing circuit of motor reversing relay 140 through relay contact 154 and again reverses the direction of rotation of the scan motor 128. At the same time the former energizing circuit of relay 170 is again established through contact 154 to permit continued drive of the scan motor in the new direction. Thus the interlocking action of the relays 156 and 170, cooperating with the switch contacts 164 and 162 to control the motor reversing relay 140, causes the transducer to perform continuous sector scan back and forth between the defined scan limits as long as switches 146, 150 and 158 remain closed. Since relays 156 and 170 are nominally similar, either may become energized by closure of sector scan switch 158, depending on fortuitous circumstances, but it does not matter which initially becomes energized upon initiation of sector scan.

Should the sector scan switch 158 be closed at a time when the switch element 160 is outside the sector defined between the switch contacts 164 and 166 the control problem arises of insuring that the motor will not be reversed by virtue of the contact which results between the element 160 and the nearest approaching switch contact 162 or 164. In other words, the switch element 160 must be permitted to enter the scan sector if it is to cause the transducer to be scanned back and forth in that sector. The manner in which this control problem is automatically solved by the illustrated circuit is as follows. If, for instance, the switch element 160 is moving counterclockwise toward switch contact 164 and away from contact 162 at the instant of closure of sector scan switch 158, reversing switch 150 being closed, engagement of switch contact 164 by the element 160 merely grounds the relay contact 154 which is already grounded due to the existing unenergized condition of relay 156. Thus the motor continues to rotate in the same direction and reverses only upon engagement of the element 160 with the switch contact 162, after the element 160 has passed through the desired scan sector.

If, on the other hand, it be assumed that the switch 150 is open and the system is scanning continuously in the clockwise sense, it is first necessary to close reversing switch 150 before closure of sector scan switch 158 can have effect. The ensuing action is then the same as in the preceding instance. In all cases, therefore, the transducer automatically seeks and finds the correct sector and performs the sector scanning therein when switch 158 is closed.

The presently preferred arrangement and form of the physical mechanical scanning components associated with the transducer unit for application aboard small vessels such as fishing boats, tugboats, etc., is depicted in a somewhat simplified form in Figures 6 and 7. The transducer scanning motor 128 and the position-transmitting selsyn 42, both mounted in the housing 172, are rotatively connected to the transducer shaft 180 through bevel gears 182 and 184 located at the upper end of such shaft inside the housing. The switch contacts 164 and 166 (Figures 5, 6 and 7) comprise leaf spring arms supported by posts which are mounted on the circumferentially adjustable support 169 at the base of the housing 172, while the switch element 160 comprises a grounded pin which contacts and brushes past the inner ends of the spring contacts 164 and 166 during rotation of the transducer drive gear 182.

The vertically disposed transducer drive shaft 180, carrying a transducer supporting yoke 181 at its lower end to permit vertical tilting of the transducer unit 20 in housing 192, is rotatively received in a tubular watertight housing 186 that extends downwardly through the bottom of the vessel's hull V by way of a packing gland 188. Fastened at its upper end to housing 172, the tubular housing 186 is free to slide up and down through the gland 188, being guided by the gland and by a separate guide post 190 mounted on the bulkhead B of the vessel; however, the tubular housing does not rotate.

Additional details of a secondary nature illustrated in Figures 6 and 7 reside in the provision of an elevation angle control motor 202 mounted in drive housing 172 to be carried bodily in rotation with the transducer azimuth drive shaft 180. The shaft 180 is hollow and receives the hollow elevation drive shaft 204 within it. Having bevel gears 206 and 208 on its upper and lower ends, respectively, the shaft 204 is driven relative to azimuth shaft 180 by the elevation control motor 202 and in turn drives the transducer-tilting gear sector 210 in the streamlined housing 192 for changing the elevation angle of the transducer unit 20. Thus the normally horizontally directed transducer may be swung downward into its downwardly directed dotted-line position shown in Figure 7 for depth sounding operation, or into any inclined position below horizontal for scanning the water area about the vessel to different desired depths.

The hollow elevation control shaft 204 serves as a shield for the two-wire flexible cable 212 connecting the transducer element to slip rings 214 and 216 at the top of the shaft 204. Electrical energy of ultrasonic frequency is carried to and from the slip rings by the brushes 218 and 220, respectively. Additional slip rings (not shown) are provided for delivering electrical energy to the elevation control motor 202.

Of corrosion resistant metal, the tubular housing 186 serves as a support for the faired teardrop transducer housing 192, which is likewise of a suitable corrosion-resistant metal such as Phosphor bronze, and is filled with a liquid such as castor oil. This teardrop housing in a typical case may be 6 inches deep, 12 inches long and about 6 inches maximum width, although the actual size and shape selected may vary. Being oriented constantly in the direction of the heading of the vessel despite rotation or tilting movements of the internal transducer unit 20, the streamlined, watertight transducer housing 192 provides a protective shield for the oil-immersed transducer unit 20 therein and minimizes two common disturbances oftentimes experienced with underwater ultrasonic transducer units. One such difficulty is the tendency for air bubbles passing beneath the moving vessel to become caught in front of irregular surfaces, such as those of an unshielded transducer, protruding beneath the hull of a vessel, and another difficulty is the ultrasonic background noise that results from the so-called cavitation effect when turbulence and shock pressure are caused by non-faired surfaces moving through the water. The collection of masses of air in the path of ultrasonic radiation acts as a mask or shield, highly attentuating the ultrasonic beam, whereas the cavitation effect noise tends to obscure the reception of faint echo impulses returning from remote reflecting bodies. The faired shape of the fixed housing 192 prevents its catching any air bubbles and disturbing the passing water. Moreover, the liquid-filled housing presents a substantially matched impedance to the transducer element rendering the housing virtually "transparent" to the ultrasonic wave energy in all rotated positions of the transducer therein.

The transducer assembly, including the unit 20 and the housing elements 192 and 186 may be adjusted up or down in relation to the vessel's hull, from the lowered position shown in Figure 6 to a raised position in which the housing 192 lies immediately beneath the hull and alongside the keel K. This adjustment is accomplished by a geared drive motor 174 under control of the operator and mounted on one side of the housing 172. A pair of pinions 176 on a common drive shaft 177 engage fixed gear racks 178 to convert rotary motion of the drive motor into vertical reciprocation of the transducer assembly including the drive housing 172 and the attached transducer assembly. Limit switches 190 (one of which does not appear) define the upper and lower positions of adjustment.

In its lowered position shown in Figure 6, the transducer may be rotated to perform either continuous or sector scanning with a substantially horizontally directed beam of energy, as desired, and no objectionable interference or obstruction from the hull of the vessel will be encountered likely to prevent detection of any object no matter how near to the water's surface it may be, so that the system will detect surface vessels as well as objects located below the surface.

In raised position, the streamlined housing 192 fits into a recess or well 194, formed alongside the wooden keel K by front and rear protective fairings, 196 and 198, respectively mounted on one side of the keel. The rear fairing 198 may be of wood or other material which has no special ultrasonic energy transmission property. However, the front fairing 196 is preferably of a special form enabling the system to be operated with the transducer unit in raised position and directed ahead of the vessel. For this purpose the front fairing comprises a hollow shell-like structure of corrosion-resistant metal such as Phosphor bronze, which is either prefilled with a liquid such as castor oil, as in the case of the transducer housing 192, or is provided with one or more openings 200 permitting it to be filled by entry of the surrounding water. Being simpler and less expensive, the latter arrangement is preferred in the case of the front fairing 196, whereas in the case of the streamlined housing 192 a filler oil or like preservative liquid having a density somewhat different from that of water is preferred in order to minimize rust and corrosion of the transducer components.

The liquid-filled front fairing 196, like the liquid-filled transducer housing 192, is effectively "transparent" to transmission of ultrasonic energy in the frequency range of interest. The faired shapes of the members 196 and 198 which define the protective transducer housing well 194 enable them to function as bumpers warding off underwater obstacles such as submerged logs or the like, while also preventing collection of air bubbles, between the transducer housing and vessel's hull, which might otherwise pile up in front of the transducer and block energy transmission. In addition, these faired shapes are such as to minimize cavitation effects producing noise readily picked up by the ultrasonic transducer.

When the transducer housing 192 is raised into the well 194 the transducer may be directed fixedly ahead of the vessel and the system operated as a detector of oncoming objects or of water's depth ahead of the vessel, as previously mentioned. However, scanning of the transducer unit through an appreciable horizontal angle in its raised position is precluded in the illustrated case by the presence of the keel K beside it. By employing full symmetrical front and rear fairing sections 196' and 198' (Figure 7–a) below keel level, instead of the half-symmetrical fairings at keel level as shown in Figure 6, the transducer unit 20 in the raised housing 192 may be oscillated back and forth for sector scanning purposes through a substantial horizontal sector angle directed ahead of the vessel without encountering direct interference from the keel K.

In Figures 8 and 9 illustrating the improved indicator device, the stylus arm 46 is mounted on a vertical shaft 222 to be rotated through bevel gears 224 by the receiving selsyn shaft 225. Preferably the selsyns 42 and 44 are connected to their respective positionally related shafts 180 and 222 through speed-reduction gearing, so as to achieve greater accuracy in the position of stylus arm 46 conforming to that of the transducer 20. A grounded rotary switch element 238 rotated with the stylus arm shaft 222 contacts and brushes by a fixed switch element 240 once every revolution of the shaft 222 and, through the conductor 242, controls a suitable co-phasing circuit of conventional form so as to establish phase synchronism between the shafts 222 and 180. The details of a suitable phasing circuit constitute no part of the present invention and are omitted from the description and drawings.

The shaft 222 is journaled in an antifriction bearing 226 located centrally in the flat metallic plate 228 constituting a ground electrode plate over which the sensitized recording paper or other impressionable medium is laid in two parallel strips, 230s and 230p. Fed from a supply roll 232 at one end of the indicator chassis, the parallel strips are spaced apart at adjacent edges sufficiently to accommodate the stylus arm drive shaft 222 therebetween. A feed roller 234 and cooperating hold-down roller 236 at the opposite end of the indicator chassis are rotated either manually or by a suitable drive motor in order to move the paper strips lengthwise over the plate 228. For some purposes a slow continuous rotation of the feed roll 234 may be desirable, whereas in other cases it may be preferred to rotate the same by increments separated by suitable time intervals of sufficient length to permit completion of one or more revolutions of the stylus arm 46 during each such interval. If desired, time or distance-travelled markings may be made on the recording strips as an aid to interpretation of the record made thereon.

The stylus arm shaft 222 is a hollow shaft and rotatably receives a hollow worm shaft 244 by which the constant-speed rotation of the stylus drive motor 246 is transmitted to the worm and sprocket drive 248 located at the inner end of the stylus arm 46. An endless belt 250 of flexible insulating material encircles pulleys 252 and 254 at opposite ends of the stylus arm. The pulley 254 is driven at constant speed by the worm and sprocket drive 248, whereas the pulley 252 is an idler. The belt 250 carries one or more styli 256a, 256b, etc., at equal spacings along its length which slide in succession over the sensitized paper strips 230p and 230s. As a stylus moves down around the drive pulley 254 and commences its outward radial travel over the sensitized paper beneath the stylus arm 46, such stylus passes momentarily between the grounded contact 258 on the arm and the insulated ring contact 260 fixed in respect to the electrode plate 228. During such engagement the stylus closes an electrical circuit (not shown) through the energized electrical conductor 262 and applies a pulse of voltage to the trigger circuit (28 in Figure 1). Thus as the stylus 256a, for example, commences its constant-speed radial travel from the central portion of the indicator, the system transmitter 24 is triggered into operation and a pulse of ultrasonic energy is beamed through the water by the directive transducer 20.

As the stylus continues its radial travel across the recording paper it moves in sliding contact with the insulated conductive strip 264 extending along the length of the underside of stylus arm 46. This conductive strip is electrically connected by the conductor 264' (shown dotted in Figure 9) to the brush control 266 mounted on the stylus arm at the upper end of the stylus drive shaft 244. The shaft 244 is hollow and passes an insulated electrical conductor extending between the brush contact 266 at the upper end of such shaft and brush contact 268 at the lower end thereof. The latter is connected to the output of the ultrasonic system receiver and carries receiver output signal impulses for application to the conductive strip 264, by which such impulses are applied to the traveling stylus. Such impulses produce an electric discharge through the sensitized paper to the underlying grounded electrode plate 228 at the instantaneous position of the stylus tip and create a visible impression on the recording paper. Paper of this type, i. e., that having an electrically discolorable or equivalent property, is commercially available and well known for application to recording indicators of other types.

By relating the speed of travel of the stylus over the recording paper to the speed of ultrasonic energy in water, it is possible to observe immediately and directly the straightline distance and direction from the vessel to each reflecting object producing impressions on the recording paper. The record made by the indicator during continuous or sector scanning operation of the system thus constitutes a plan-position or map-like display of various reflecting bodies and surfaces in the entire or sector area surrounding the vessel. A transparent plate 270 mounted over the top of the recording surface and bearing suitable grid markings which represent range and azimuth, facilitates in the interpretation of the record produced.

If desired, the gear transmission 245 by which motor rotation is applied to shaft 244 may be of the adjustable-ratio type so that the stylus scan speed and pulse repetition rate of the ultrasonic system may be varied at will. In this manner the period of time required for the stylus to travel the length of arm 46 may be made to correspond to different maximum range settings of the basic detection system. To the same end a motor 246 of an adjustable speed type, with speed regulation, may also be used.

When scanning with a horizontally directed narrow beam of energy the "line of sight" distance to the different objects recorded by the indicator device is substantially in direct proportion to the plan-position or map distance to such objects. However, for objects at appreciable depths detected by a beam directed at a material downward inclination, it may in some instances be advisable to apply a correction to the indications if true horizontal or map distances are to be determined. The indicator display, in other words, is a two-dimensional display wherein true relative azimuth is always recorded, but wherein map range determinations may require a correction factor determined by depth of the reflecting body of interest. For many purposes refined interpretations of this character are unnecessary. One technique available for establishing the approximate vertical angle, hence the depth, of a particular object at known range involves scanning the transducer unit up and down in elevation angle by periodically reversing the direction of rotation of the elevation control motor 202, and noting the elevation angle of the transducer unit at which the signal strength from the selected object is a maximum. A receiver output meter, headphones, or any other indicating device may be used for determining the transducer tilt angle producing maximum signal strength. The horizontal distance to that object will of course then be the product of "line-of-sight" distance (displayed on the indicator) times the cosine of the transducer negative elevation angle at which maximum signal intensity is obtained.

In the alternative form of automatic recording indicator appearing in Figures 10 and 11, the stylus arm is rotatively supported from above the plate electrode 228' instead of from below it, so as to permit use of a single strip of sensitized recording paper 230' in lieu of the split or double strip arrangement necessitated in the preceding form by the presence of the shaft 222 projecting up through the center of the electrode plate 228. In the modified indicator the stylus arm 46' is rotatively supported by the end of cantilever arm 280 projecting over the recording surface from a mounting 281 at one end of the indicator chassis. For purposes of illustration the mounting 281 is shown at the end of the chassis corresponding to the location of the paper supply roll 232'. Preferably the cantilever support arm 280 overlies that portion of the indicator recording area corresponding to the direction to the rear of the vessel in terms of the stylus arm position. In this position arm 280 overlies the indication area corresponding to the "utrasonically opaque" or "blind" sector which lies directly to the rear of every vessel underway and is caused by the presence of air bubbles in the stern wake. Thus, while permitting the use of a single strip of recording paper, the overhanging cantilever arm supporting the stylus arm 46' obscures no useful portion of the indication record.

Certain other details of the construction shown in Figure 11 which correspond in terms of function or effect to those of the indicator mechanism appearing in Figure 9 are designated with similar numerals bearing the prime symbol and most require no further description. Slip rings 282 and 284 are provided at the lower side of the arm 280 concentric with stylus arm drive shaft 222' to be contacted by the brushes 286 and 288 mounted on the stylus arm. The brushes are connected to the timing contacts 260' and 258', respectively, and provide the desired circuit connections for the trigger circuit 28 (Figure 1). The cantilever arm 280 houses suitable drive shafts 244' and 225' connected to the stylus drive motor and receiving selsyn, which are not shown in these figures. The transparent grid plate 270' is located along the underside of the cantilever arm rather than above it, so as to minimize its separation from the recording surface, hence minimize parallax errors.

It will be evident to those skilled in the art that a cathode ray tube indicator employing a radial range sweep therein generated by a magnetic deflection coil rotated by receiver selsyn 44 could be provided in addition to or in lieu of the indicator 26 for certain types of situations, although with less success in some instances, and that any other suitable indicating devices or auxiliary equipment may be added to the illustrated system, if desired.

It will further be evident to those skilled in the art that gyro-stabilizer mounting apparatus of any suitable type for the transducer may be employed as a means of maintaining the scan axis at a constant attitude with respect to the earth's center so that pitching and rolling of the ship will not impair, interrupt or distort the indicated results of system scanning operation.

I claim as my invention:

1. Recording indicator means for application in scanning type pulse transmission-reception systems, comprising means for supporting an electrically sensitized recording strip in planar form, means to feed the supported recording strip progressively lengthwise of itself, an electrical stylus, guide means supporting and guiding said stylus for recurring substantially linear sweep movement thereof in sliding contact with one face of said recording strip, means movably supporting said guide means and operable to move the same bodily relative to said recording strip support in a direction generally transverse to the instantaneous sweep path of said stylus and in a plane parallel to said recording strip to permit following the scanning movement of the system, electrode means comprising a conductive surface supportingly positioned in contact with the opposite face of said strip, and means for applying signal voltages between said stylus and said electrode and thereby correspondingly marking said strip by the resulting localized electric discharge therein at the respective instantaneous points being traversed by the stylus.

2. Recording indicator means for use in scanning type pulse transmission-reception systems, comprising means for supporting an electrically sensitized recording strip in planar form, an electrical stylus, an elongated guide arm, pulleys mounted on said arm at respective locations spaced apart along the length thereof, an endless belt encircling said pulleys and supporting said stylus for recurring substantially linear sweep movement lengthwise of said arm, means rotationally supporting said arm in generally parallel relationship to said guide strip for sliding contact of said stylus with one face of said strip during such recurring sweep movements, said arm support means guiding said arm for rotation thereof about a transverse axis perpendicular to said strip face, thereby to permit rotational shifting of said sweep in accordance with scanning of the system, electrode means comprising a conductive surface supportingly positioned in contact with the opposite face of said strip, and means for applying signal voltages between said stylus and said electrode and thereby correspondingly marking said strip by the resulting localized electric discharge therein at the respective instantaneous points being traversed by the stylus.

3. Recording indicator means for use in scanning pulse type transmission-reception systems, comprising means for supporting an electrically sensitized recording strip in planar form, an electrical stylus, a stylus guide member, means carried by said guide member for moving said stylus recurringly along a substantially linear sweep path on said guide member, means rotationally supporting said guide member in position relative to said strip to establish sliding contact of said stylus with one face of said strip during such recurring sweep movements, said guide member support means guiding said guide member for rotation thereof about a transverse axis perpendicular to said strip face, thereby to permit rotational shifting of said sweep in accordance with scanning of the system, electrode means comprising a conductive surface supportingly positioned in contact with the opposite face of said strip, and means for applying signal voltages between said stylus and said electrode and thereby correspondingly marking said strip by the resulting localized electric discharge therein at the respective instantaneous points being traversed by the stylus.

4. Recording indicator means as defined in claim 3, wherein the recording strip support means comprises a recording strip supply roll and a recording strip feed roll disposed in spaced parallel relationship therewith, said rolls being operable to permit progressive advancement of the recording strip over the conductive surface of the electrode.

5. Recording indicator means defined in claim 4, wherein the guide means comprises an arm carrying pulleys spaced apart along the length thereof and a stylus-supporting endless belt encircling said pulleys for moving the stylus lengthwise of said arm, the means movably supporting said guide means comprising a member supporting said stylus arm for rotational movement thereof in a plane parallel to the recording strip.

6. Recording indicator means comprising a stationary electrode member including a substantially flat electrically conductive surface adapted to support electrically sensitive recording paper thereon and having breadth and width dimensions of the same general order of magnitude, an elongated stylus electrode guide member, means rotationally supporting said guide member by one end thereof, with said guide member disposed adjacent to said surface and generally parallel thereto, to rotate about an axis perpendicular to said conductive surface at a generally central location thereon, a stylus electrode, means movably mounted on said guide member and carrying said stylus electrode for recurring movement of such stylus electrode lengthwise of said elongated guide member and in contact with recording paper supported on said conductive surface, and means for applying electric recording signals between said stylus electrode and conductive surface in varying positions of said stylus electrode relative to said guide member and in varying rotational positions of said guide member relative to said stationary electrode member.

7. The recording indicator means defined in claim 6, wherein the movably mounted means comprises an endless belt carrying the stylus electrode thereon, and guide pulleys encircled by said belt at locations spaced apart along the length of the elongated guide member.

8. The recording indicator means defined in claim 6, wherein the guide member rotational support means is structurally connected to the stationary electrode at one side of the conductive surface thereon and extends from such point of connection over said surface, with an uninterrupted space formed therebetween to permit movement of the recording paper slidably along said surface, and recording paper roll means operatively supported in relation to the conductive surface to feed a strip of recording paper progressively across said surface.

9. Recording indicator means for application in scanning type pulse transmission-reception systems, comprising means for supporting an electrically sensitized recording strip in planar form, an electrical stylus, guide means supporting and guiding said stylus for recurring substantially linear sweep movement thereof in sliding contact with one face of said recording strip, said stylus guide means comprising an arm member and means thereon for moving the stylus progressively along the length of said arm, an elongated cantilever member, means supporting said cantilever member at a location offset from the planar recording strip to project therefrom to a generally central location overlying said strip, the projecting end portion of said cantilever member rotationally supporting said stylus guide arm for rotative scan movement thereof in a plane substantially parallel to the plane of the recording strip and between said cantilever arm and said strip, electrode means comprising a conductive surface supportingly positioned in contact with the opposite face of said strip, and means for applying signal voltages between said stylus and said electrode and thereby correspondingly marking said strip by the resulting localized electric discharge therein at the respective instantaneous points being traversed by the stylus.

10. Recording indicator means defined in claim 9, wherein the electrode means comprises a substantially flat plate electrode supporting the recording strip against yielding to stylus pressure, and the stylus moving means on the guide arm comprises an endless belt carrying the stylus, and pulley members encircled by such belt at locations spaced apart lengthwise of such arm.

11. Recording indicator means defined in claim 10, wherein the recording strip support means comprises a recording strip supply roll and a recording strip feed roll disposed in spaced parallel relationship therewith, said rolls being operable to permit progressive advancement of the recording strip over the plate electrode.

References Cited in the file of this patent

UNITED STATES PATENTS

| Number | Name | Date |
|---|---|---|
| 1,391,681 | Hahnemann | Sept. 27, 1921 |
| 2,396,722 | Russel | Mar. 19, 1946 |
| 2,449,985 | Gloess | Sept. 28, 1948 |
| 2,469,940 | Yonkers | May 10, 1949 |
| 2,475,363 | Turner | July 5, 1949 |
| 2,486,151 | Gross | Oct. 25, 1949 |
| 2,502,975 | McFarlane | Apr. 4, 1950 |
| 2,530,035 | Watt | Nov. 14, 1950 |
| 2,532,347 | Stodola | Dec. 5, 1950 |
| 2,591,138 | Cooley | Apr. 1, 1952 |
| 2,605,453 | Miller | July 29, 1952 |